(12) United States Patent
McAllister (10) Patent No.: US 11,752,815 B2
(45) Date of Patent: Sep. 12, 2023

(54) HITCH RECEIVER

(71) Applicant: Weigh Safe, LLC, Lindon, UT (US)

(72) Inventor: Kevin McAllister, American Fork, UT (US)

(73) Assignee: Weigh Safe, LLC, Lindon, UT (US)

( * ) Notice: Subject to any disclaimer, the term of this patent is extended or adjusted under 35 U.S.C. 154(b) by 0 days.

(21) Appl. No.: 17/666,137

(22) Filed: Feb. 7, 2022

(65) Prior Publication Data

US 2022/0250426 A1    Aug. 11, 2022

Related U.S. Application Data

(63) Continuation of application No. 16/167,378, filed on Oct. 22, 2018, now abandoned, which is a continuation of application No. 14/932,749, filed on Nov. 4, 2015, now Pat. No. 10,106,002, which is a continuation-in-part of application No. 14/284,273, filed on May 21, 2014, now Pat. No. 9,327,566.

(60) Provisional application No. 62/075,151, filed on Nov. 4, 2014, provisional application No. 61/948,487, filed on Mar. 5, 2014, provisional application No. 61/928,166, filed on Jan. 16, 2014, provisional application No. 61/826,247, filed on May 22, 2013.

(51) Int. Cl.
| | |
|---|---|
| *B60D 1/46* | (2006.01) |
| *B60D 1/48* | (2006.01) |
| *B60D 1/24* | (2006.01) |
| *G01L 5/101* | (2020.01) |
| *G01L 19/10* | (2006.01) |
| *G01L 7/16* | (2006.01) |
| *B60D 1/62* | (2006.01) |
| *B60D 1/06* | (2006.01) |
| *G01G 19/10* | (2006.01) |
| *G01G 19/12* | (2006.01) |

(52) U.S. Cl.
CPC .............. *B60D 1/465* (2013.01); *B60D 1/06* (2013.01); *B60D 1/246* (2013.01); *B60D 1/248* (2013.01); *B60D 1/485* (2013.01); *B60D 1/62* (2013.01); *G01L 5/101* (2013.01); *G01L 7/166* (2013.01); *G01L 19/10* (2013.01); *G01G 19/10* (2013.01); *G01G 19/12* (2013.01); *G01L 7/163* (2013.01)

(58) Field of Classification Search
CPC .......... B60D 1/465; B60D 1/06; B60D 1/246; B60D 1/248; B60D 1/485; B60D 1/62
See application file for complete search history.

(56) References Cited

U.S. PATENT DOCUMENTS

| | | | | | |
|---|---|---|---|---|---|
| 3,700,053 | A | * | 10/1972 | Glissendorf | ............. G01G 3/08 177/136 |
| 3,918,744 | A | * | 11/1975 | Gay | ................... B62D 53/0857 280/901 |
| 5,257,797 | A | * | 11/1993 | Johnson | ................. B60D 1/465 280/490.1 |
| 7,219,915 | B2 | * | 5/2007 | Christensen | ........... B60D 1/665 280/491.1 |
| 2004/0052625 | A1 | * | 3/2004 | Butterfield | .............. B60P 1/435 414/537 |

* cited by examiner

*Primary Examiner* — Jacob D Knutson
(74) *Attorney, Agent, or Firm* — Thorpe North & Western, LLP; David W. Osborne (57) ABSTRACT

A height adjustable hitch receiver is disclosed and described.

23 Claims, 6 Drawing Sheets

HITCH RECEIVER

PRIORITY DATA

This application is a continuation of U.S. patent application Ser. No. 16/167,378, filed Oct. 22, 2018, which is a continuation of U.S. patent application Ser. No. 14/932,749, filed Nov. 4, 2015, now issued as U.S. Pat. No. 10,106,002, which claims the benefit of U.S. Provisional Patent Application Ser. No. 62/075,151, filed on Nov. 4, 2014, each of which is incorporated herein by reference. U.S. patent application Ser. No. 14/932,749, filed Nov. 4, 2015, now issued as U.S. Pat. No. 10,106,002, is also a continuation in part of U.S. patent application Ser. No. 14/284,273, filed May 21, 2014, which claims the benefit of U.S. Provisional Patent Application Ser. No. 61/826,247, filed on May 22, 2013, 61/928,166, filed on Jan. 16, 2014, and 61/948,487, filed on Mar. 5, 2014, each of which is incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the tongue weight or static downward force that the trailer applies to the hitch of the tow vehicle. If the tongue of the trailer does not apply enough downward force to the hitch, a dangerous condition called trailer sway could result. If the tongue of the trailer applies too much downward force to the hitch, then the rear tires of the tow vehicle can be overloaded, thus pushing the rear of the vehicle around and compromising steering and/or braking of the tow vehicle. A generally acceptable tongue weight for any trailer is somewhere between 9% and 15% of the gross trailer weight (GTW). Measuring tongue weight typically involves weighing the tongue weight of the trailer when decoupled from the tow vehicle, which can be time consuming and dangerous. In addition, for safe and comfortable towing, the trailer should be as level as possible. A level trailer will put less strain on the connection between the trailer and the hitch and will also help the trailer stay in line behind the tow vehicle.

SUMMARY OF THE INVENTION

Accordingly, the present disclosure provides trailer hitch devices, systems, and associated methods thereof. In one aspect, for example, a height adjustable hitch receiver is provided. Such a height adjustable hitch receiver can include a mounting portion configured to couple to a vehicle. The height adjustable hitch receiver can also include a linkage mechanism extending from the mounting portion. The height adjustable hitch receiver can further include a receiver portion supported by the linkage mechanism and configured to receive a hitch. In addition, the height adjustable hitch receiver can include an actuator configured to move the linkage mechanism from a first position to a second position. The linkage mechanism can be configured such that the receiver portion moves vertically relative to the mounting portion while maintaining an orientation of the receiver portion.

The present disclosure also provides a load measuring hitch receiver. Such a load measuring hitch receiver can include a support portion. The load measuring hitch receiver can also include a receiver portion configured to receive a hitch, wherein the receiver portion is supported by the support portion and constrained to translational movement by the support portion. In addition, the load measuring hitch receiver can include a load measurement device disposed between the support portion and the receiver portion to measure a force in a direction of the translational movement. A magnitude of the force measured by the load measurement device can be substantially equal to a magnitude of a downward force on a hitch engaged with the receiver portion.

The present disclosure additionally provides a method of measuring a weight on a hitch. Such a method can include obtaining a load measuring hitch receiver having a support portion, a receiver portion configured to receive a hitch, wherein the receiver portion is supported by the support portion and constrained to translational movement by the support portion, and a load measurement device disposed between the support portion and the receiver portion to measure a force in a direction of the translational movement, wherein a magnitude of the force measured by the load measurement device is substantially equal to a magnitude of a downward force on a hitch engaged with the receiver portion. The method can also include engaging a hitch with the receiver portion. The method can further include disposing a load on the hitch. Additionally, the method can include observing the magnitude of the downward force on a display.

DETAILED DESCRIPTION OF THE INVENTION

Definitions

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Invention Embodiments

Figure 1:
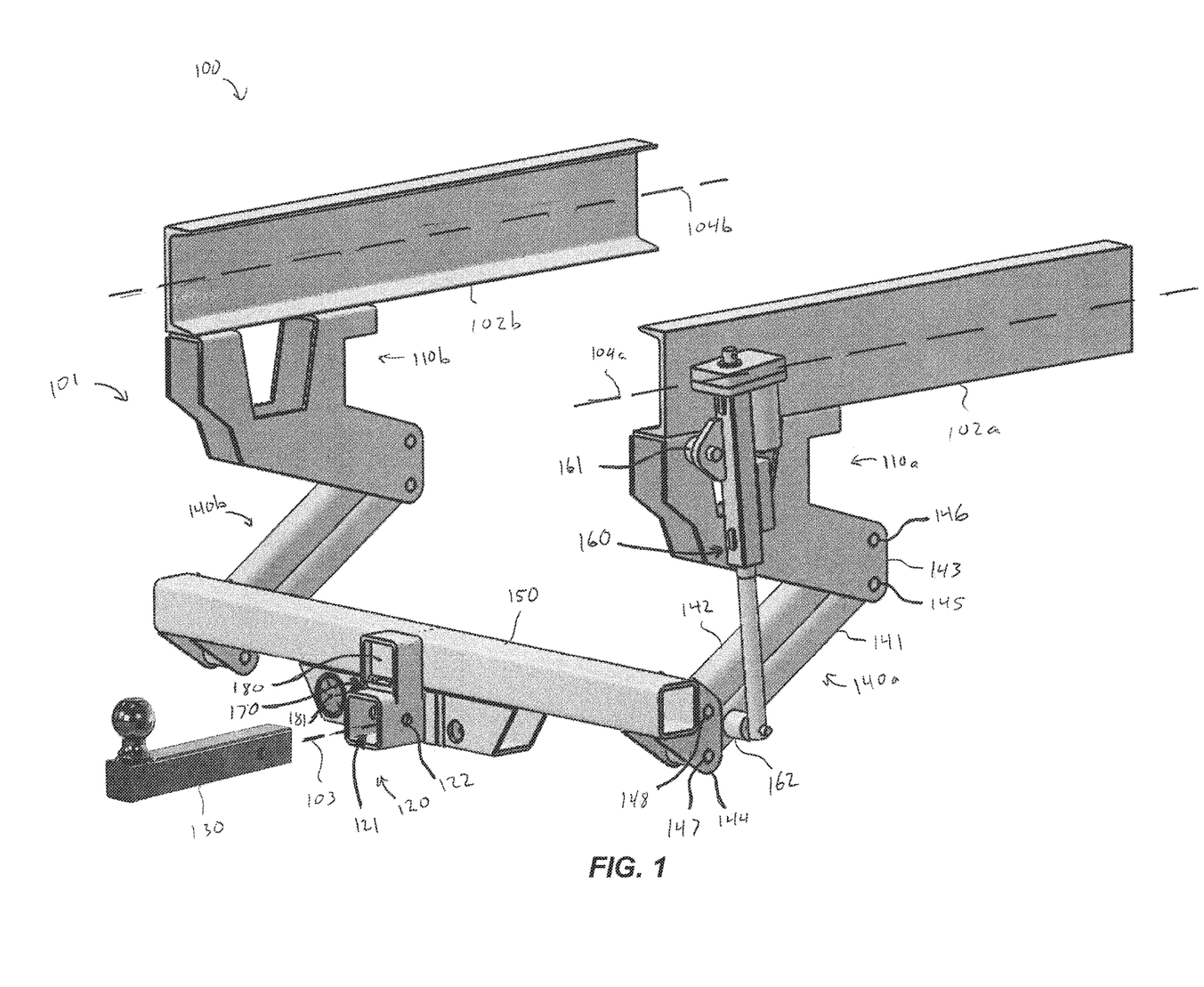
FIG. 1 illustrates a height adjustable and load measuring hitch receiver in accordance with an example of the present disclosure.

FIG. 1 illustrates an example of a trailer hitch system 100 in accordance with an example of the present disclosure. The trailer hitch system 100 can include a hitch receiver 101 that can be associated with a vehicle, such as by coupling to vehicle frame members 102a, 102b, as shown. The hitch receiver 101 can include a mounting portion 110a, 110b configured to couple to the vehicle (e.g., to the vehicle frame members 102a, 102b). The hitch receiver 101 can couple to the vehicle in any suitable manner, such as with a threaded fastener or other removably coupling, or with a weld or other permanent coupling. The hitch receiver 101 can include a receiver portion 120 configured to interface and couple with a hitch or hitch accessory, such as drawbar 130 or any other suitable type of hitch accessory or mount for attachment to the vehicle. A typical drawbar may be configured as a ball mount for coupling with a trailer tongue. The receiver portion can be of any suitable size or configuration, such as a standard 2½", 2", or 1¾" size square hitch receiver configuration. The receiver portion 120 can include an opening 121 to receive the hitch or hitch accessory (i.e. the drawbar 130) and can include a hole 122 or other suitable coupling feature to facilitate securing the hitch or hitch accessory to the hitch receiver 101, such as with a pin or threaded fastener.

In one aspect, FIG. 1 illustrates the hitch receiver 101 as an example of a height adjustable hitch receiver. For example, the hitch receiver 101 can be configured to facilitate a variable vertical position of the receiver portion 120, which can facilitate matching or approximating a vertical height of a trailer tongue. Accordingly, the hitch receiver can include one or more linkage mechanisms 140a, 140b to provide for vertical movement of the receiver portion 120, which can be supported by the linkage mechanisms 140a, 140b. The linkage mechanisms 140a, 140b can extend from the mounting portion 110a, 110b. Although only a single linkage mechanism can be utilized, in the example illustrated in FIG. 1, the height adjustable hitch receiver includes two linkage mechanisms. Thus, in one aspect, the linkage mechanisms 140a, 140b can be disposed on lateral sides of the receiver portion 120 to provide stability for the receiver portion 120. Each of the linkage mechanisms 140a, 140b can be coupled to the mounting portion 110a, 110b, respectively, to provide fixed support for the linkage mechanisms. As mentioned above, the mounting portion 110a, 110b can be coupled to and supported by the vehicle frame members 102a, 102b. A transverse support 150 can be coupled to the linkage mechanisms 140a, 140b and can extend at least the distance between the vehicle frame members 102a, 102b to align the linkage mechanisms 140a, 110b and the mounting portions 110a, 110b with the respective vehicle frames 102a, 102b. The receiver portion 120 can be supported by the transverse support 150, such as at a middle portion of the transverse support.

In one aspect, the linkage mechanisms 140a, 140b can be configured such that the receiver portion 120 moves vertically relative to the mounting portion 110a, 110b while maintaining an orientation of the receiver portion 120. For example, the receiver portion 120 can be lowered and raised while a longitudinal axis 103 of the opening 121 remains parallel to longitudinal axes 104a, 104b of the frame members 102a, 102b of the vehicle. The linkage mechanism can utilize any suitable mechanism type with any suitable number of linkage members. In one aspect, the linkage mechanisms 140a, 140b can comprise four-bar linkage mechanisms, as illustrated. For example, the linkage mechanism 140a can include a base member 143, which can form part of the mounting portion 110a, a pair of linkage arms 141, 142, and a lower linkage arm 144, which can also serve as a bracket for coupling with the transverse support 150. The linkage arms 141, 142 can be rotatably coupled to the base member 143 at 145, 146, respectively. The linkage arms 141, 142 can be rotatably coupled to the lower linkage arm 144 at 147, 148, respectively.

Figure 2A:
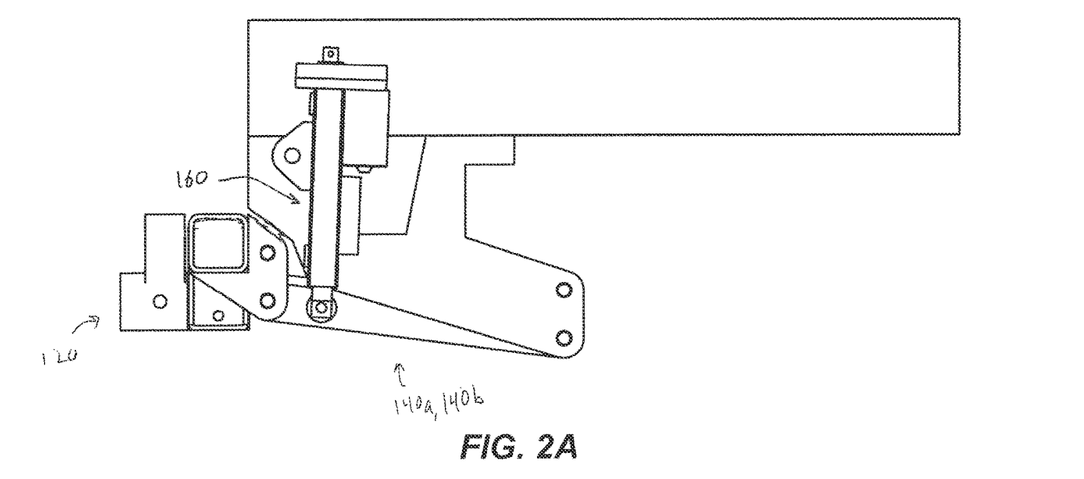
FIG. 2A illustrates the hitch receiver of FIG. 1 in a raised configuration.
Figure 2B:
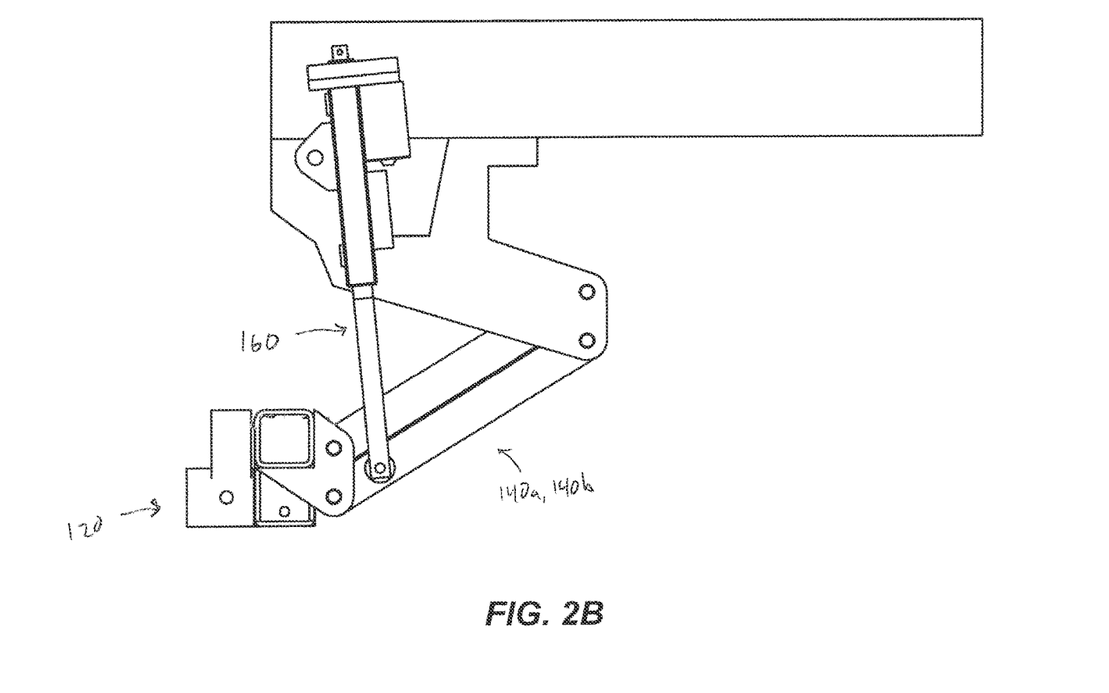
FIG. 2B illustrates the hitch receiver of FIG. 1 in a lowered configuration.

The height adjustable hitch receiver can include an actuator 160 to provide force and/or torque to move the receiver portion 120, such as by moving the linkage mechanisms 140a, 140b from one position to another position (e.g., a raised position in FIG. 2A and a lowered position in FIG. 2B). Any suitable type of actuator can be used in any combination, such as a linear actuator and/or a rotary actuator, and can utilize any suitable type of power, such as electric, hydraulic, pneumatic, etc. In the example illustrated in FIG. 1, the actuator 160 is a linear actuator (e.g., a hydraulic actuator and/or a pneumatic actuator) rotatably coupled to the mounting portion 110a at 161 to provide a fixed support. In addition, the actuator 160 can be rotatably coupled to one of the linkage arms, in this case the linkage arm 141 at 162, although it should be recognized that other configurations are possible. It should also be recognized that any suitable number of actuators can be used. For example, one or more actuators can be associated with each lateral side or with each linkage mechanism 140a, 140b. Furthermore, the linkage mechanisms 140a, 140b can be configured for any suitable range of vertical motion, such as from about 6" to about 18", although these ranges are not meant to be limiting.

In another aspect, FIG. 1 illustrates the hitch receiver 101 as an example of a load measuring hitch receiver. The load measuring hitch receiver can be configured to measure a load or force on the hitch or hitch accessory (i.e. the drawbar 130) engaged with the receiver portion 120, such as a tongue weight of a trailer. In addition to the receiver portion 120, the load measuring hitch receiver can include a support portion 170 and a load measurement device 180. In one aspect, the support portion 170 can be associated with and/or supported by the transverse support 150.

Figure 3A:
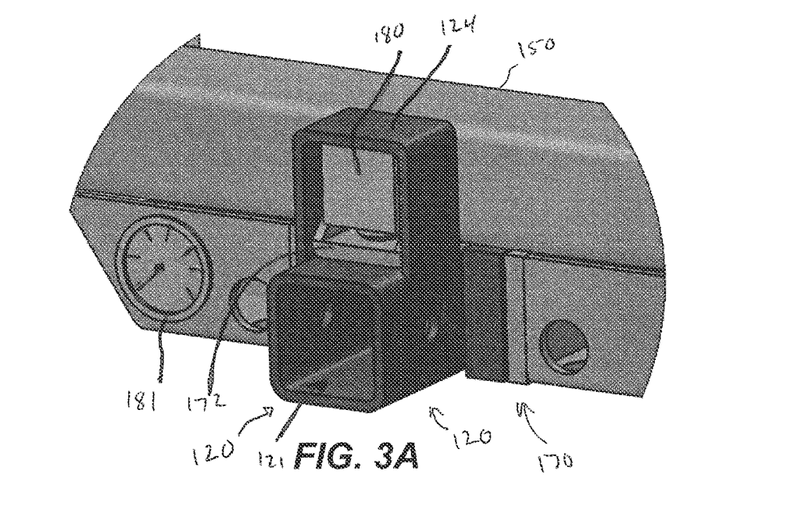
FIG. 3A is a detail view of load measuring features of the hitch receiver of FIG. 1.
Figure 3B:
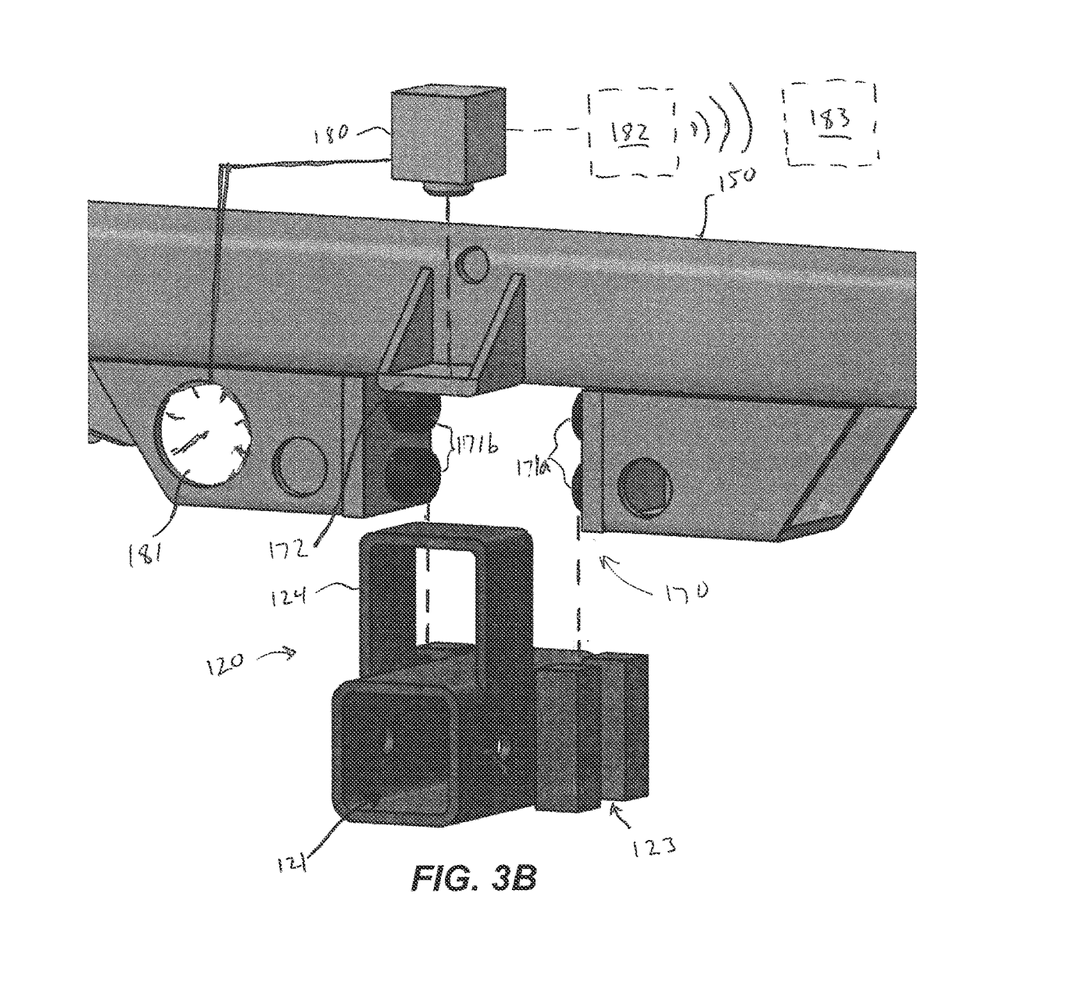
FIG. 3B is an exploded detail view of the load measuring features of the hitch receiver of FIG. 1.

FIG. 3A is a detail view of the load measuring hitch receiver of FIG. 1, and FIG. 3B is an exploded detail view to illustrate various features of the load measuring hitch receiver. In one aspect, the receiver portion 120 can be configured to move vertically relative to the support portion 170. For example, the support portion 170 can comprise bearings 171a, 171b, and the receiver portion 120 can comprises channels, such as a channel 123, to receive the bearings to constrain the receiver portion 120 to translational movement in the vertical direction. It should be recognized that receiver portion 120 can include bearings and the support portion 170 can have channels, as desired. It should also be recognized that any suitable device, structure, or material can be utilized to achieve relative translational movement between the receiver portion 120 and the support portion 170, such as a tongue and groove or other type of sliding configuration.

The support portion 170 can include a platform 172 to interface with the load measurement device 180. Thus, the receiver portion 120 can act on the load measurement device 180, which can be resisted by the platform 172 of the support portion 170. In one aspect, the receiver portion 120 can include an extension member 124 to interface with the load measurement device 180. The extension member 124 can extend at least partially about the load measurement device 180 and the platform 172. In this configuration, the extension member 124 and the opening 121 of the receiver portion 120 can be disposed on opposite sides of the platform 172. Thus, the receiver portion 120, via the extension member 124, can "pull down" on the load measurement device 180, which is disposed on, and supported by, the platform 172 of the support portion 170. It should be recognized that the example configuration shown and described is not to be limiting, as other configurations are possible to facilitate locating the load measurement device 180 between the receiver portion 120 and the support portion 170 such that the load measurement device 180 can measure a force acting on the receiver portion 120. For example, the entire structure of a receiving portion may reside above a load measurement device that is disposed on a support portion. In this example, the receiving portion can "push down" on the load measurement device.

Figure 4:
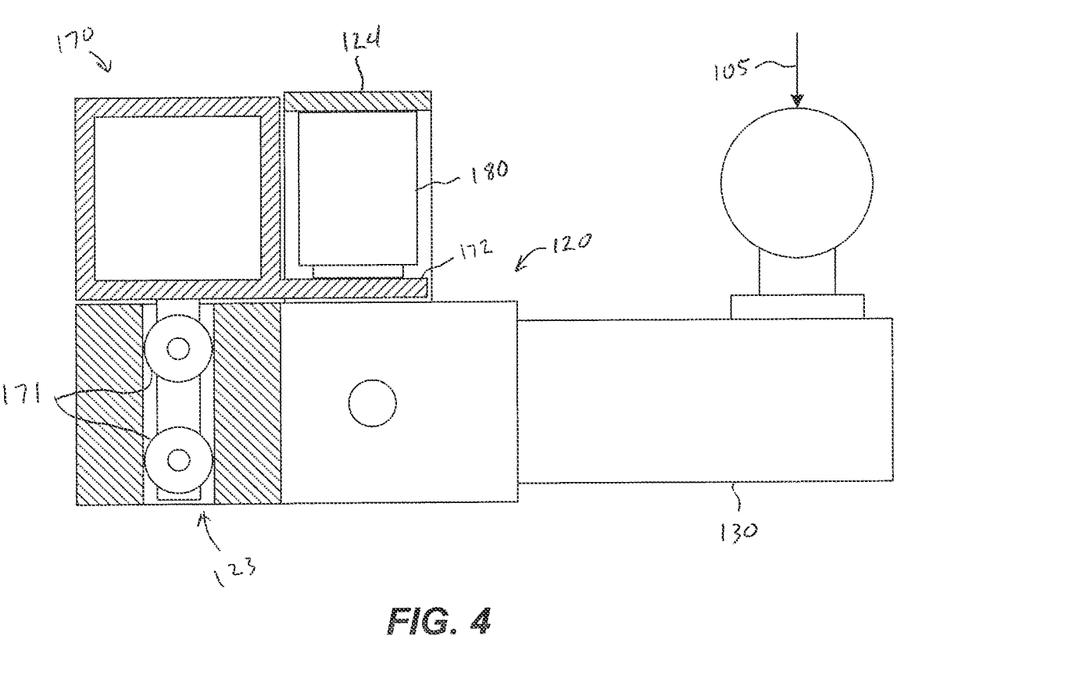
FIG. 4 is a schematic diagram illustrating the load measuring operation of the hitch receiver of FIG. 1.

FIG. 4 is a schematic diagram illustrating the operation of a load measuring hitch receiver in accordance with an example of the present disclosure. Although certain features or elements schematically illustrated in FIG. 4 may differ from those illustrated in FIGS. 1-3A, the same reference numbers will be used to describe FIG. 4.

As shown in FIG. 4, the receiver portion 120 can be supported by the support portion 170 and configured to move vertically relative to the support portion 170. In one aspect, the support portion 170 supports the receiver portion 120 by constraining the receiver portion 120 to translational movement relative to the support portion 170 in the direction of the force to be measured (e.g., a vertical direction to measure a weight or a downward force 105 due to gravity). In another aspect, the support portion 170 supports the receiver portion 120 by the platform 172, via the load measurement device 180, which is disposed between the support portion 170 and the receiver portion 120. The load measurement device 180 can also be supported by the support portion 170, in this case, by the platform 172. The receiver portion 120 can be configured to interface with the load measurement device 180, such that downward movement of the receiver portion 120 relative to the support portion 170 causes the receiver portion 120 to act on the load measurement device 180, thus facilitating the measurement of the force 105 acting on the receiver portion 120 via the hitch (e.g., the drawbar 130). In particular, a magnitude of the force measured by the load measurement device 180 can be equal to a magnitude of the downward force 105 within some acceptable margin of error depending on the limitations of the load measurement device and resistance (e.g., due to friction) to relative translational movement between the receiver portion 120 and the support portion 170.

In one aspect, constraining the receiver portion 120 to move vertically can enable the load measurement device 180 to experience the entire magnitude of the force 105 applied to the receiver portion 120 via the drawbar 130. The load measuring hitch receiver can therefore effectively and accurately measure the applied load 105, such as a tongue weight of a trailer on a ball mount extending from the receiver portion 120, regardless of the position of the applied load 105 relative to the load measurement device 180. This is beneficial because the position of the applied load 105 relative to the load measurement device 180 may vary depending on how far into the receiver portion 120 the drawbar 130 is inserted. Thus, the load measuring hitch receiver can accurately measure a load on the drawbar 130 regardless of where the load is positioned relative to the load measurement device 180, which can ensure accurate determinations of the downward force 105 on the drawbar 130.

Constraining the receiver portion 120 to move in a single translational degree of freedom (e.g., parallel to the downward force 105) can avoid rotational movement of the receiver portion 120, or a fulcrum of such rotational movement. This is beneficial because such rotational movement could prevent the load measurement device 180 from experiencing the full magnitude of the force 105 applied to the receiver portion 120. The receiver portion 120 can be constrained to vertical movement by bearings 171 (e.g., roller bearings) in the channel 123, although any suitable structure or device can be utilized. Minimizing friction or other such resistance to relative translational movement between the receiver portion 120 and the support portion 170 can enable a force acting on the load measurement device 180 to more closely represent the downward force 105 acting on the hitch (e.g., the drawbar 130). Resistance to such relative movement can generate forces between the receiver portion 120 and the support portion 170 that will offset, to some degree, the downward force 105 acting on the hitch (e.g., the drawbar 130), thereby reducing the force measured by the load measurement device 180.

As mentioned above, the load measurement device 180 can be configured to determine a magnitude of the downward force 105 on the drawbar 130 and, therefore, the tongue weight of a trailer. It should be recognized that any suitable type of load measurement device can be utilized. For example, the load measurement device 180 can comprise a load cell or transducer, such as a strain gage load cell, a mechanical load cell, a hydraulic load cell, and/or a pneumatic load cell, or any other suitable type of load cell.

With continued reference to FIGS. 1-4, the load measuring hitch receiver can include a display 181 (see FIG. 3B) configured to indicate the magnitude of the downward force 105, as determined by the load measurement device 180. In one aspect, the display 181 can be associated with the support portion 170, as shown in FIG. 3B. The display 181 can be any suitable type of display, such as an analog or a digital display. The display 181 can be coupled to the load measurement device 180 in any suitable manner such that the display 181 can properly indicate the magnitude of the load on the drawbar 130. In one aspect, the display 181 can be mechanically, electrically, hydraulically, and/or pneumatically coupled to the load measurement device 180. The load measurement device 180 and/or the display 181 can therefore include any suitable mechanical, electrical, hydraulic, and/or pneumatic device or mechanism that can facilitate the determination and/or display of the magnitude of the load on the drawbar 130. For example, the load measurement device 180 and/or the display 181 can include a processor and/or memory to determine the magnitude of the load on the drawbar 130. In one aspect, a mobile device, such as a smartphone or a tablet, can include a processor and/or memory used to determine the magnitude of the load on the drawbar 130, such as by executing an application. In another aspect, the display 181 can be calibrated to indicate the magnitude of the load on the drawbar 130, based on mechanical, electrical, hydraulic, and/or pneumatic input from the load measurement device 180. In a particular aspect, therefore, the display 181 can be integral with the load measurement device 180 in determining the magnitude of the load on the drawbar 130.

The load measuring hitch receiver can also include a transmitter 182 (see FIG. 3B) such that load data pertaining to the magnitude of the downward force 105 on the drawbar 130 can be wired or wirelessly transmitted to a location remote from the hitch receiver, such as to a location inside a vehicle. In one aspect, the transmitter 182 can transmit load data to a display 183 that is remote from the hitch receiver. For example, the remote display 183 can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, the remote display 183 can comprise a screen of a mobile device, such as a smartphone or a tablet. Thus, the load data can be communicated to any suitable location, in or out of the vehicle. It should therefore be recognized that the display 181, 183 can be disposed in any suitable location and can be in communication with the load measurement device 180 via any suitable means. In one aspect, the load measurement device 180, the display 181, and/or the transmitter 182, or any other related item or device, such as a processor, memory, a battery, or a RF receiver, can be located in or on the load measuring hitch receiver.

Although the load measuring hitch receiver includes what is generally referred to as a drawbar (configured as a "ball mount" in the figures) throughout the present disclosure for coupling with a trailer, it should be recognized that the load measuring hitch receiver can include any suitable form of coupling with a trailer, such as a lunette ring and pintle hook. Aspects of the present disclosure that facilitate measuring tongue weight of a trailer by utilizing an interaction between a receiver hitch and a hitch can be incorporated into such coupling arrangements.

The hitch receiver of FIG. 1 is configured as both a height adjustable hitch receiver and a load measuring hitch receiver. It should be recognized that a hitch receiver in accordance with the present disclosure can be configured as a height adjustable hitch receiver and/or a load measuring hitch receiver. Thus, a hitch receiver need not be height adjustable and configured to measure tongue weight. For example, the hitch receiver of FIG. 1 can include the load measuring features disclosed herein without including height adjustable features, such as by attaching the transverse support 150 directly to the vehicle frame members 102a, 102b. On the other hand, the hitch receiver of FIG. 1 can include the height adjustable features disclosed herein without including load measuring features, such as by having a receiver portion fixedly coupled to the transverse support 150.

Figure 5A:
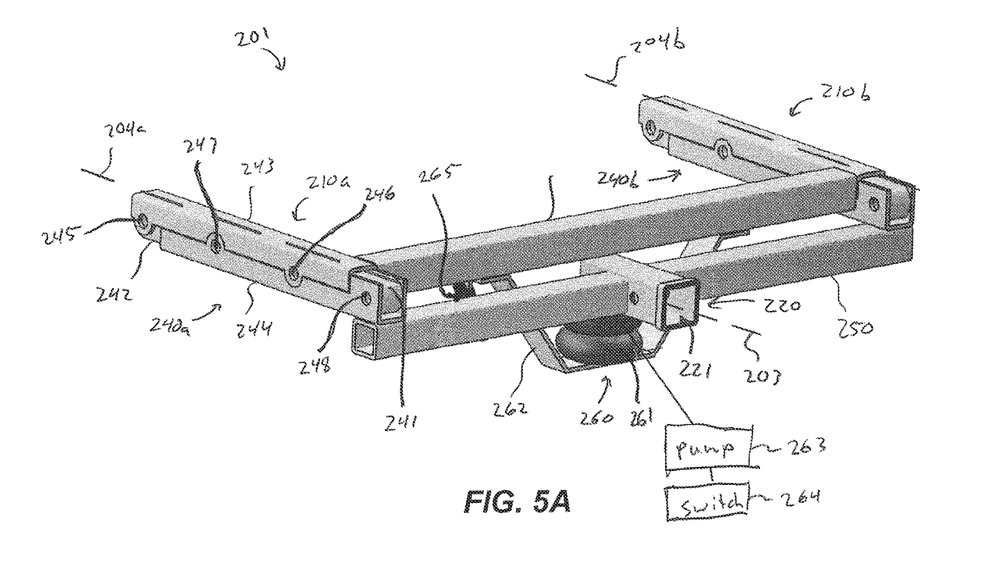
FIGS. 5A and 5B illustrate an adjustable height hitch receiver in accordance with an example of the present disclosure.
Figure 5B:
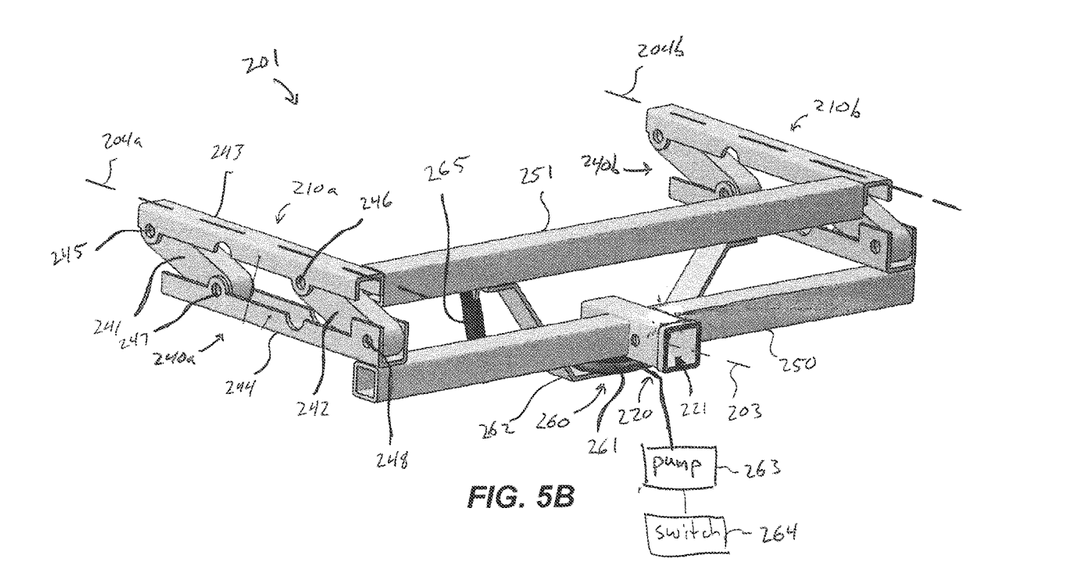

FIGS. 5A and 5B illustrate a hitch receiver 201 that includes height adjustable features in accordance with an example of the present disclosure without including load measuring features, although such load measuring features may be included. The hitch receiver 201 has some similarities with the hitch receiver 101 of FIG. 1 discussed above. For example, the hitch receiver 201 includes a mounting portion 210a, 210b configured to couple to a vehicle, a receiver portion 220 configured to interface and couple with a hitch or hitch accessory, and one or more linkage mechanisms 240a, 240b to provide for vertical movement of the receiver portion 220. In addition, a transverse support 250 can extend between and be coupled to the linkage mechanisms 240a, 240b. The receiver portion 220 can be supported by the transverse support 250, such as at a middle portion of the transverse support 250.

In one aspect, the linkage mechanisms 240a, 240b can be configured such that the receiver portion 220 moves vertically relative to the mounting portion 210a, 210b while maintaining an orientation of the receiver portion 220. For example, the receiver portion 220 can be lowered and raised while a longitudinal axis 203 of the opening 221 remains parallel to longitudinal axes 204a, 204b of vehicle frame members (not shown). The linkage mechanisms 240a, 240b can be configured as four-bar linkage mechanisms. For example, the linkage mechanism 240a can include a base member 243, which can form part of the mounting portion 210a, a pair of linkage arms 241, 242, and a lower linkage arm 244, which can also serve as a bracket for coupling with the transverse support 250. The linkage arms 241, 242 can be rotatably coupled to the base member 243 at 245, 246, respectively. The linkage arms 241, 242 can be rotatably coupled to the lower linkage arm 244 at 247, 248, respectively.

The height adjustable hitch receiver 201 can include an actuator 260 to provide force and/or torque to move the receiver portion 220, such as by moving the linkage mechanism 240a, 240b from one position to another position (e.g., a raised position in FIG. 5A and a lowered position in FIG. 5B). In this case, the actuator 260 includes a bladder 261 that can be inflated and deflated (i.e., with a fluid such as gas) to position the receiver portion 220. For example, a transverse support 251 can extend between and be coupled to the mounting portion 210a, 210b, such as at the base member 243. The transverse support 251 can provide support for a bladder base 262. The bladder 261 can be positioned between the bladder base 262 and the receiver portion 220 and/or the transverse support 250. For example, the bladder base 262 can extend below the transverse support 251 to position the bladder 261 beneath the receiver portion 220 and/or the transverse support 250, although other configurations are possible. A pump 263 and associated valves can be fluidly coupled to the bladder 261 to regulate pressure within the bladder 261. Bladder pressure can be controlled by a switch 264, which can be located locally on the hitch receiver 201 or remotely, such as on or in a vehicle. Actuation of the actuator 260 can cause the bladder 261 to inflate or deflate, thus causing the receiver portion 220 to move. The linkage mechanisms 240a, 240b and the bladder 261 can be configured for any suitable range of vertical motion, such as from about 6" to about 18", although these ranges are not meant to be limiting.

The bladder 261 may act as a spring, which may allow the receiver portion 220 to move up and down in response to bumps experienced by the vehicle and/or trailer during transit. Thus, the height adjustable hitch receiver 201 can also include a shock absorber 265 coupled to the transverse support 251 and to the receiver portion 220 and/or the transverse support 250 to minimize such movement of the receiver portion 220 due to movement of the vehicle and/or trailer. Any suitable type of shock absorber may be utilized.

Figure 6:
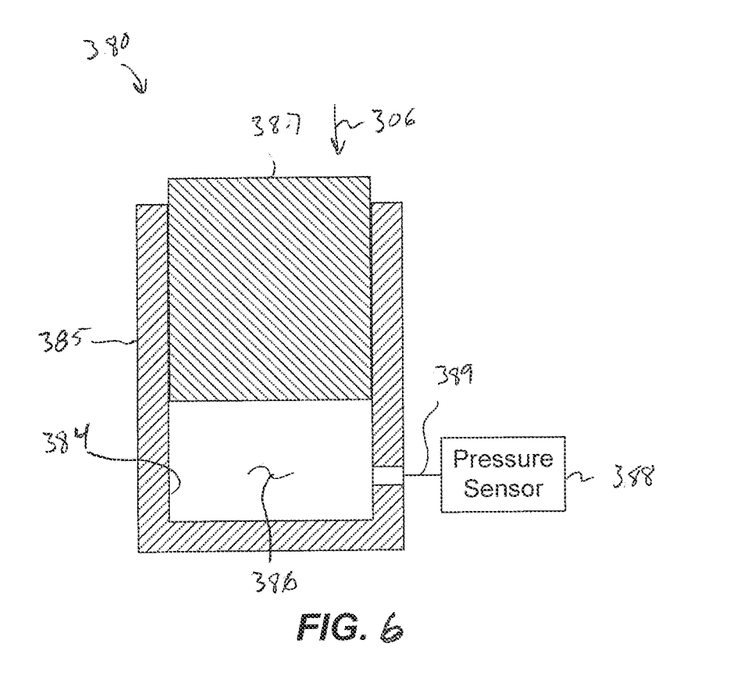
FIG. 6 illustrates a load measurement device in accordance with an example of the present disclosure.

FIG. 6 illustrates a load measurement device 380 in accordance with an example of the present disclosure. The load measurement device 380 can be utilized in a load measuring hitch receiver as disclosed herein. The load measurement device 380 can include a fluid reservoir 384, such as a cylinder, which can be defined by a housing 385. The load measurement device 380 can also include a fluid 386 and a piston 387 disposed in the reservoir 384. The housing 385 and the piston 387 can be configured to interface with a receiving portion and/or a supporting portion of a load measuring receiver hitch as disclosed herein. The piston 387 can be configured to affect a pressure of the fluid 386 as a result of a force on the load measurement device 380 in a direction 306 of a relative translational movement between a receiving portion and a supporting portion. For example, upon application of a force on the load measurement device 380 from a hitch (e.g., a drawbar), the piston 387 can be forced to move within the reservoir 384 in the direction 306, causing a pressure change in the fluid 386.

The load measurement device 380 can further include a pressure sensor 388 in fluid communication with the reservoir 384, such as via a conduit 389. The pressure sensor 388 can be configured to indicate a quantity of the force acting on the load measurement device 380 based on the pressure of the fluid 386. In one aspect, the pressure sensor 388 can include a pressure gage that is calibrated to mechanically indicate, such as with a dial readout, a load acting on a hitch via a receiver portion. In another aspect, the pressure sensor 388 can include a transducer configured to output an electrical signal based on the pressure of the fluid 386. The electrical signal can be received by a processor that can determine the load on the hitch based on the pressure represented by the electrical signal. The load can then be displayed, such as on a mechanical, electronic or digital display, as disclosed herein. Such a display can be located proximate the pressure sensor 388 or included with a pressure gage. It should be recognized that a display can be disposed in any suitable location and can be in communication with the pressure sensor 388 via any suitable means. The pressure sensor 388, a display, or any other related item or device can be located in or on any component of a load measuring hitch receiver as disclosed herein. For example, the pressure sensor 388 and/or a display can be associated with a support portion of a load measuring hitch receiver. In another example, a transmitter can be included to communicate the magnitude of the downward force on a hitch to a remote display.

In one aspect, the present disclosure can provide a method of measuring a weight on a hitch. The method can include obtaining a load measuring hitch receiver having a support portion, a receiver portion configured to receive a hitch, wherein the receiver portion is supported by the support portion and constrained to translational movement by the support portion, and a load measurement device disposed between the support portion and the receiver portion to measure a force in a direction of the translational movement, wherein a magnitude of the force measured by the load measurement device is substantially equal to a magnitude of a downward force on a hitch engaged with the receiver portion. The method can also include engaging a hitch with the receiver portion. The method can further include disposing a load on the hitch. Additionally, the method can include observing the magnitude of the downward force on a display. It is noted that no specific order is required in this method, though generally in one embodiment, these method steps can be carried out sequentially.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A height adjustable hitch receiver, comprising:
   a mounting portion configured to couple the height adjustable hitch receiver to a towing vehicle;
   a linkage mechanism extending from the mounting portion;
   a receiver portion supported by the linkage mechanism and configured to receive a hitch; and
   an actuator operable to move the linkage mechanism from a first position to a second position to adjust a distance between the receiver portion and the mounting portion;
   wherein the linkage mechanism is configured such that the receiver portion moves vertically relative to the mounting portion while maintaining an orientation of the receiver portion; and further comprising:
   a support portion coupled to the linkage mechanism and configured to support the receiver portion and constrain the receiver portion to translational movement; and
   a load measurement device disposed between the support portion and the receiver portion operable to measure a force in a direction of the translational movement, wherein a magnitude of the force measured by the load measurement device substantially equals a magnitude of a downward force on a hitch engaging the receiver portion.

2. The height adjustable hitch receiver of claim 1, wherein the linkage mechanism comprises a plurality of linkage mechanisms.

3. The height adjustable hitch receiver of claim 2, further comprising a transverse support coupled to the plurality of linkage mechanisms, wherein the receiver portion is supported by the transverse support.

4. The height adjustable hitch receiver of claim 2, wherein the actuator comprises a plurality of actuators, such that each actuator of the plurality of actuators is associated with at least one linkage mechanism of the plurality of linkage mechanisms.

5. The height adjustable hitch receiver of claim 1, wherein the actuator comprises a linear actuator, a rotary actuator, or a combination thereof.

6. The height adjustable hitch receiver of claim 5, wherein the linear actuator comprises a hydraulic actuator, a pneumatic actuator, or a combination thereof.

7. The height adjustable hitch receiver of claim 5, wherein the linear actuator is coupled to the mounting portion and the linkage mechanism.

8. The height adjustable hitch receiver of claim 1, wherein the actuator comprises an inflatable bladder operable to adjust the distance between the receiver portion and the mounting portion; and
   wherein inflation or deflation of the inflatable bladder to adjust a distance between the receiver portion and the mounting portion causes the linkage mechanism to be moved from the first position to the second position.

9. The height adjustable hitch receiver of claim 8, further comprising a shock absorber to minimize movement of the receiver portion during transit.

10. The height adjustable hitch receiver of claim 1, wherein the linkage mechanism comprises a four-bar linkage mechanism.

11. The height adjustable hitch receiver of claim 1, wherein the support portion comprises a plurality of bearings to constrain the receiver portion to translational movement.

12. The height adjustable hitch receiver of claim 11, wherein the receiver portion comprises a channel to receive the plurality of bearings.

13. The height adjustable hitch receiver of claim 1, wherein the receiver portion comprises an extension member to interface with the load measurement device.

14. The height adjustable hitch receiver of claim 13, wherein the support member comprises a platform to interface with the load measurement device.

15. The height adjustable hitch receiver of claim 14, wherein the extension member extends at least partially around the load measurement device and the platform.

16. The height adjustable hitch receiver of claim 15, wherein the extension member and an opening of the receiver portion to receive the hitch are disposed on opposite sides of the platform.

17. The height adjustable hitch receiver of claim 1, further comprising a display configured to indicate the magnitude of the force on the hitch.

18. The height adjustable hitch receiver of claim 17, wherein the display is associated with the support portion.

19. The height adjustable hitch receiver of claim 1, further comprising a transmitter to communicate the magnitude of the force on the hitch to a remote display.

20. The height adjustable hitch receiver of claim 1, wherein the load measurement device comprises a load cell.

21. The height adjustable hitch receiver of claim 20, wherein the load cell comprises a strain gage load cell, a mechanical load cell, a hydraulic load cell, a pneumatic load cell, or a combination thereof.

22. The height adjustable hitch receiver of claim 1, wherein the load measurement device comprises:
- a reservoir having a fluid and a piston disposed therein, wherein the piston is configured to affect a pressure of the fluid as a result of the force in the direction of the translational movement; and
- a pressure sensor in fluid communication with the reservoir.

23. A method of adjusting a height of the receiver portion of the height adjustable hitch receiver of claim 1, the method comprising:
- actuating the actuator to move the linkage mechanism from a first position to a second position to adjust a distance between the receiver portion and the mounting portion.

* * * * *